G. B. CIRIGLIANO.
COMPASSES FOR DESCRIBING ELLIPSES.
APPLICATION FILED APR. 23, 1912.

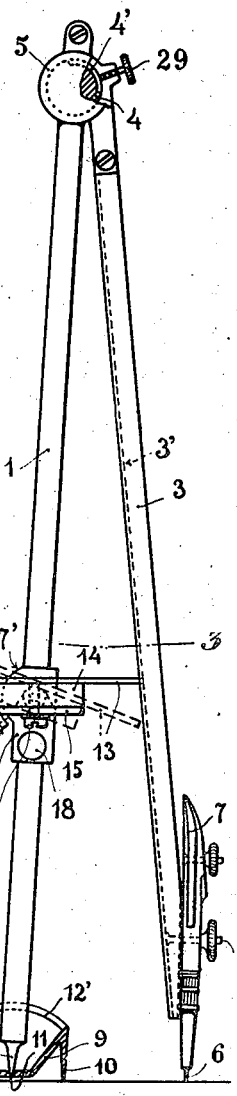
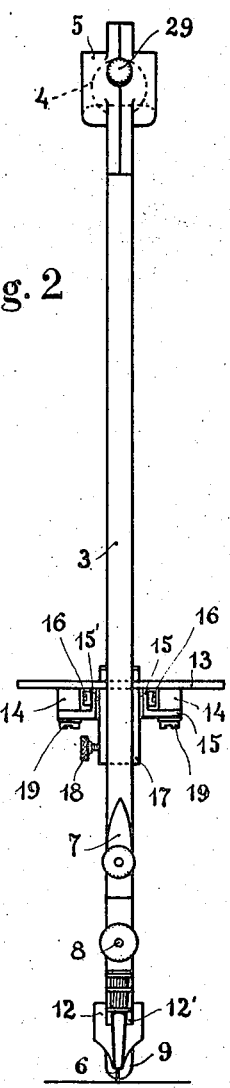

1,128,289.

Patented Feb. 16, 1915.
2 SHEETS—SHEET 2.

Witnesses;

Inventor;
Giovanni Battista Cirigliano,
By Knight Bros
Attys.

UNITED STATES PATENT OFFICE.

GIOVANNI BATTISTA CIRIGLIANO, OF TURIN, ITALY.

COMPASSES FOR DESCRIBING ELLIPSES.

1,128,289.     Specification of Letters Patent.     Patented Feb. 16, 1915.

Application filed April 23, 1912. Serial No. 692,580.

*To all whom it may concern:*

Be it known that I, GIOVANNI BATTISTA CIRIGLIANO, a subject of the King of Italy, residing at Turin, Italy, have invented certain new and useful Improvements in Compasses for Describing Ellipses; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention has for its object compasses which permit tracing ellipses and, eventually, circles.

The compasses, for the purpose of describing ellipses, differs from the usual compasses as follows: The centering leg of the compasses, during the tracing operation, is supported by a device serving to prevent the rotation of the said leg, but allowing its inclination in all directions; whereas the leg which carries the pencil-point is jointed with the centering leg so as to be free of displacing itself in all directions, and, during the tracing operation, it is guided by a templet of circular shape, which is securely connected with the centering leg.

A form of construction of the said compasses has been illustrated by way of example in the accompanying drawing, in which—

Figure 3:
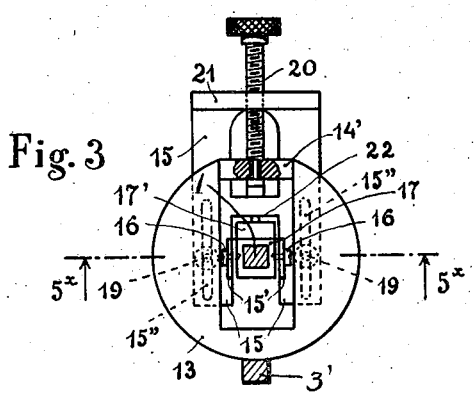
Figure 4:
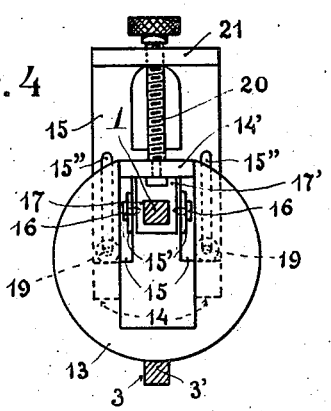
Figure 5:
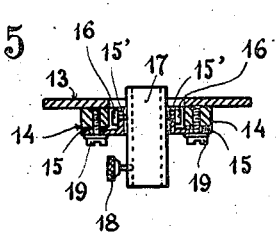
Figure 6:
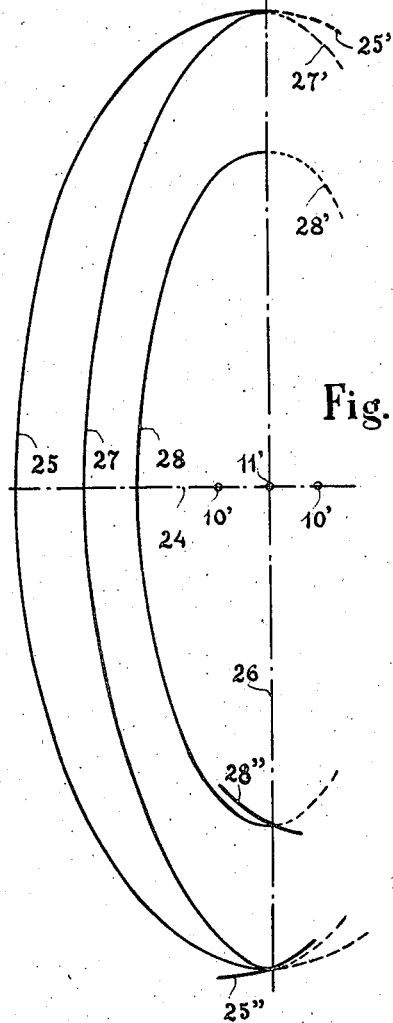

Figures 1 and 2 show in side elevation and in front elevation, respectively, the compasses ready to use. Fig. 3 is a section along line 3—3 of Fig. 1 and shows a plan of the whole guiding plate or circular templet; Fig. 4 is a similar view to Fig. 3, but with the parts in different relative position; Fig. 5 shows a cross section of the said templet on the line 5×—5× of Fig. 3; Fig. 6 shows some curves traced with the said compasses.

The compasses according to the present invention, consist of the leg 1, preferably of square section, and whose end is provided with the centering point 2; and the leg 3, also preferably of square section, slightly concave on its inward side 3' (Fig. 1), and whose upper end is jointed to the upper end of the leg 1 so as to be movable in all directions. This joint is preferably constructed as a ball and socket joint, consisting of the ball 4 forming the upper end of the leg 1, and of the spherical socket 5 composed of two pieces connected together and to the upper end of the leg 3. The lower end of the said leg 3 is provided with pencil-point 6 and pen-point 7, these two pieces being preferably united in a single piece invertibly mounted around a pivot with screw 8.

In order to secure the centering leg against rotation, but allow oscillation in all directions, I preferably provide a centering frame or bridge shown in longitudinal section in Fig. 1. The centering frame or bridge consists of the central body 9, provided with two points 10, 10 at its sides and with the central point 11 projecting from the bottom of the body 9; the said point 11 being disposed on the same straight line passing through the two points 10, 10 and equally distant from each of them. The upper arc 12 of the said centering frame or bridge, is provided with an oblong slot 12' through which is introduced the leg 1, whose centering point 2 adjusts itself on the bottom of a central cup 9' of the body 9. It is obvious, that the said centering frame, which, when it is secured by means of its three points 10, 10, 11 on the drawing, is prevented from rotation, and that it as a consequence prevents any rotation of the leg 1 because this leg is of square section and of the same width as the slot 12' of the arc 12. The said leg 1 is nevertheless free to oscillate in all directions, that is to say: in longitudinal direction along the slot 12', and in transverse direction by causing at the same time the oscillation of the centering frame.

The guiding device, whose scope is that of insuring to the tracing point 6 or 7 of the leg 3 the desired elliptical course consists essentially of a circular templet 13, made of metallic plate, which, by means of its base 14, is mounted capable of sliding longitudinally on the supporting plate 15 (Figs. 1 and 3 to 5). This supporting plate 15, by means of its central projections 15' bent at right angles, and by means of the screws 16, 16, is mounted to the sliding block 17 so as to be capable of oscillating. This block is slidably mounted along the leg 1 and provided with a pressure screw 18 for securing it in the desired position along the leg 1.

The longitudinal sliding of the templet 13 and of its base 14 in regard to the supporting plate 15, is obtained by means of the slots 15", 15" formed in the same plate 15 and through which slots pass the screws 19, 19 threaded in the base 14. The control of the longitudinal displacement of the said templet is obtained by means of the screw 20 threaded in the rear projection 21 of the plate 15, the end of the said screw engaging the cross piece 14' of the base 14 so as to be capable of rotation. It is obvious, that, when the screw 20 is rotated in one or in the other direction, the templet is caused to displace itself longitudinally in one or the other direction in regard to its centered position shown in Fig. 3. Thus, for instance, in Fig. 4 the templet has been shown as if it were entirely displaced toward the front.

The oscillation movement of the whole guiding device around the screws 16 of the sliding block 17, is operated by hand while a thumb screw 22 threaded in the extension, 23 projecting from the lower part of the plate 15, is pressing against the cylindrical back portion 17' of the sliding block 17, and serves to secure the whole guiding device in any desired position.

From the foregoing it will be easily understood how the said compasses can be used and operated. Firstly, the centering frame is mounted in its right place on the drawing, so that its central point 11 is situated on the center 11' of the ellipse to be traced (Fig. 6), and so that the two side points 10, 10 are fixed in two points 10', 10' of the smaller axis 24 of the ellipse. The end of the leg 1 is now inserted through the slot 12' of the centering frame, and the centering point 2 placed in the central cup 9'. Then the leg 3 is swung around the templet 13, while maintaining the concave inward side 3' of the leg 3 in contact with the edge of the plate 13, and the tracing point of the leg 3 (pencil point 6, or pen point 7) in contact with the drawing, which is possible in consequence of the fact that the centering leg 1 is free to be inclined in all directions. In this manner it is possible to describe the half ellipse 25; the tracing of the other half 25' is obtained in an identical manner by retracting momentarily the leg 1 from the centering frame and by turning the whole instrument 180°.

It is obvious that the length of the axes of the described ellipse, as well as the proportion between the said axes, depend respectively on the height in which the templet is placed along the leg 1, and on the inclination of the said templet in respect to the leg 1. In fact, if the tracing of the ellipse 25, 25' (Fig. 6) has been carried out with the templet disposed in the position indicated in Fig. 1, and if it then should be desired to describe a larger or a smaller ellipse (as indicated by 28 28'), it would be sufficient to respectively raise or lower the templet 13 along the leg 1. If on the other hand it were desired to describe an ellipse 27, 27' in which the greater axis is like to the one of 25 25', but the smaller axis is smaller than the corresponding one of 25, 25', it would then suffice to incline the templet 13 as shown in dotted lines in Fig. 1.

From the foregoing it will be understood, that with the possibility of regulating the height and the angular position of the templet 13 in regard to the leg 1, it would be possible to describe an ellipse having axes of a given length.

It is to be noted here, that, in order to describe arcs of ellipses with exactness, it is necessary, that, corresponding to the height of the templet 13 along the leg 1, the position of the said templet be adjusted in longitudinal direction, which is attained by operating the screw 20. In fact, if the templet 13 were always maintained centered, as in Fig. 3, without regard to its height along the leg 1, there would be obtained (Fig. 6) tracings of curves like 25" or 28", which would not correspond to arcs of ellipses, and whose tangents in their point of intersection with the greater axis of the ellipse were not perpendicular to the said axis. Whereas, by means of suitable displacement from the central position of the templet 13 in one direction or another, as required by operating the screw 20 in one direction or another, it will now be possible to obtain tracings of real elliptical arcs 25 and 28. The adjustment in longitudinal direction by means of the screw 20 of the templet 13 does not present any difficulty, and is accomplished very rapidly by the operator before he begins tracing the ellipse. In order to insure exactness of the said adjustment the following artifice may be resorted to, taking advantage of the fact that the legs 1 and 3 have a square cross section. After having fixed the centering frame of the compasses in its right position on the drawing with regard to the minor axis of the ellipse, the tracing point 6 is placed on a point of the greater axis of the ellipse to be described, at the same time retaining the inward concave side 3' of the leg 3 in contact with the templet 13. The templet is then displaced by means of the screw 20 until one of the parallel side faces of the leg 3 is caused to place itself in the same plane as the corresponding side face of the leg 1. In order to be sure that this condition is satisfied, a straight edge is leaned simultaneously against the side faces of the legs 1 and 3.

The compasses described above may also be used for tracing circles, by screwing in the thumb screw 29 threaded in the spherical socket 5, until its point enters the meridian slot 4' formed in the sphere 4. The leg 3 has then only the opportunity of being oscillated in one plane, and the compasses can now be used as if they were ordinary compasses, after the guiding-device or templet 13 and also the centering frame have been removed.

It is obvious that the invention is not strictly limited to the particular arrangements shown and described, and that any modifications within the range of every expert may be made as required or rendered advantageous by the circumstances or the requirements of practice without departing from the essential nature of the invention.

Claims.

1. A pair of compasses for tracing elliptical curves, having a centering leg, a tracing leg, and a joint between the two legs permitting movement in all directions; means for locking said centering leg against rotation, said means permitting oscillation of said centering leg in one plane only relative to said means, a templet mounted to slide in the length direction on said centering leg and displaceable transversely thereof; said tracing leg being constructed to impinge against the edge of said templet.

2. A pair of compasses for tracing elliptical curves, having a centering leg, a tracing leg, and a joint between the two legs permitting movement in all directions; means for locking said centering leg against rotation, said means permitting oscillation of said centering leg in one plane only relative to said means, a templet mounted to slide in the length direction on said centering leg and displaceable transversely thereof in said tracing leg constructed to impinge against the edge of said templet; said means comprising a shoe having three downwardly projecting points all in alinement, a recess in said shoe provided with parallel walls and corresponding flat surfaces on said centering leg constructed to impinge against said parallel walls, a centering point at the lower end of said centering leg, and a central pocket therefor in said shoe.

3. A pair of compasses for tracing elliptical curves, having a centering leg, a tracing leg, and a joint between the two legs permitting movements in all directions, means for locking said centering leg against rotation, said means permitting oscillation of said centering leg in one plane only relative to said means, a circular templet having sliding connection longitudinally and transversely relative to said centering leg and constructed to be oscillated in the longitudinal direction and to contact with said tracing leg.

4. A pair of compasses for tracing elliptical curves, having a centering leg, a tracing leg, and a joint between the two legs permitting movement in all directions; means for locking said centering leg against rotation, said means permitting oscillation of said centering leg in one plane only relative to said means, a circular templet constructed to contact with the inner side of said tracing leg, a carrier for said templet, transverse guides on said carrier and a displacing screw on said carrier and connected with said templet for the purpose of sliding the templet in a transverse plane relative to said carrier, and means for holding said carrier with the templet in adjusted position on said centering leg.

5. A pair of compasses for tracing elliptical curves, having a centering leg, a tracing leg, and a joint between the two legs permitting movement in all directions; means for locking said centering leg against rotation, said means permitting oscillation of said centering leg in one plane only relative to said means, a circular templet constructed to contact with the inner side of said tracing leg, a carrier for said templet, transverse guides on said carrier and a displacing screw on said carrier and connected with said templet for the purpose of sliding the templet in a transverse plane relative to said carrier, a slide mounted around said centering leg and adapted to be longitudinally displaced thereon; said carrier being mounted to oscillate on said slide, a set screw for locking said slide in any desired position on said centering leg, and another set screw on said carrier to lock said carrier in any desired angular position to said slide.

The foregoing specification signed at Turin (Italy) this 9th day of April, 1912.

GIOVANNI BATTISTA CIRIGLIANO.

Witnesses:
JOCELYN SOUBAYRAN,
RAMEO LIMOSI.